(12) United States Patent
Deisinger et al.

(10) Patent No.: US 6,321,251 B1
(45) Date of Patent: *Nov. 20, 2001

(54) GATEWAY FOR DYNAMICALLY PROVIDING WEB SITE STATUS INFORMATION

(75) Inventors: Mark V. Deisinger, Shoreview; Robert J. Gambrel, Spring Lake Park, both of MN (US)

(73) Assignee: Unisys Corporation, Blue Bell, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,673

(22) Filed: Oct. 1, 1998

(51) Int. Cl.$^7$ .................................................. G06F 15/16
(52) U.S. Cl. ........................ 709/203; 709/217; 709/246
(58) Field of Search .................................. 709/217, 203, 709/218, 246, 311; 707/203, 511

(56) References Cited

U.S. PATENT DOCUMENTS

| | | | | |
|---|---|---|---|---|
| 5,715,453 | * | 2/1998 | Stewart | 707/513 |
| 5,724,424 | | 3/1998 | Gifford | 380/24 |
| 5,754,772 | * | 5/1998 | Leaf | 709/203 |
| 5,860,071 | * | 1/1999 | Ball et al. | 707/100 |
| 5,898,836 | * | 4/1999 | Freivald et al. | 709/218 |
| 5,933,604 | * | 8/1999 | Inakoshi | 709/226 |
| 5,933,827 | * | 8/1999 | Cole et al. | 707/10 |
| 5,978,842 | * | 11/1999 | Noble et al. | 709/218 |
| 5,991,756 | * | 11/1999 | Wu | 707/3 |
| 6,026,432 | * | 2/2000 | Potts, Jr. | 709/203 |
| 6,029,175 | * | 11/1999 | Chow et al. | 707/104 |
| 6,032,162 | * | 2/2000 | Burke | 707/501 |
| 6,032,182 | * | 2/2000 | Mullen-Schultz | 709/223 |
| 6,035,330 | * | 3/2000 | Astiz et al. | 709/218 |
| 6,041,360 | * | 3/2000 | Himmel et al. | 709/245 |
| 6,049,812 | * | 4/2000 | Bertram et al. | 707/516 |
| 6,055,570 | * | 4/2000 | Nielsen | 709/224 |
| 6,105,028 | * | 8/2000 | Sullivan et al. | 707/10 |
| 6,128,644 | * | 10/2000 | Nozaki | 709/203 |
| 6,134,591 | * | 10/2000 | Nickles | 709/229 |
| 6,212,546 | * | 4/2001 | Starkovich et al. | 709/203 |
| 6,249,795 | * | 6/2001 | Douglis | 707/511 |
| 6,253,198 | * | 6/2001 | Perkins | 707/3 |

FOREIGN PATENT DOCUMENTS

WO 97/40617 * 10/1997 (WO).

OTHER PUBLICATIONS

Douglis, F., et al., WebGUIDE: Quering and Navigating Changes in Web Repositories, Comp. Networks & ISDN Systems, vol. 28, No. 11, pp. 1335–1344, May 1996.*

Technical Details: Web Pages and Transactions on the 2200 Node, owlweb1.creighton.edu/pages/adminhelp/tech1.htm, Unisys Corp., pp. 1–8, Jun. 1998.*

Jon G. Auerbach, "Open Market Inc. Says It Will Receive Patents for Internet–Commerce Software," *Wall Street Journal,* Mar. 3, 1998, p. 36.

* cited by examiner

*Primary Examiner*—Zarni Maung
*Assistant Examiner*—Andrew Caldwell
(74) *Attorney, Agent, or Firm*—Charles A. Johnson; Mark T. Starr; Nawrocki, Rooney & Sivertson, P.A.

(57) ABSTRACT

Apparatus and method which allows a user to dynamically gather Web Site status information from a Web Browser. In a preferred embodiment, the present invention allows a user to gather information on which Web Pages within a Web Site have been recently updated. The present invention utilizes a workstation-based custom gateway to interconnect a user's Web Browser to the Web Server which hosts the Web Site. This gateway includes a program which receives a user-tailorable search request from a Web Browser, traverses a portion of the Web-accessible file structure of the Web Server, identifies Web Site files which meet the search request criteria, builds a table of results from the search, and returns the search results to the Web Browser. The present invention also allows an administrator to customize the table of results returned to the Web Browser.

31 Claims, 6 Drawing Sheets

GATEWAY FOR DYNAMICALLY PROVIDING WEB SITE STATUS INFORMATION

CROSS REFERENCE TO CO-PENDING APPLICATIONS

The present application is related to U.S. patent application Ser. No. 09/164,759, filed Oct. 1, 1998 entitled "A COMMON GATEWAY WHICH ALLOWS APPLETS TO MAKE PROGRAM CALLS TO OLTP APPLICATIONS EXECUTING ON AN ENTERPRISE SERVER", which is assigned to the assignee of the present invention and incorporated herein by reference.

BACKGROUND OF THE INVENTION

1. Field of the Invention

The present invention relates to a gateway for dynamically providing Web Site status information and, more specifically, to a gateway which allows a user to dynamically gather information on which pages within a Web Site have been updated.

2. Description of the Prior Art

The methods by which companies conduct business with their customers are undergoing fundamental changes, due in large part to World Wide Web technology. In addition, the same technology that makes a company accessible to the world, may be used on internal company networks for conducting operational and administrative tasks.

One of the technologies underlying the World Wide Web is the Web Browser. Web Browsers have become a de facto user interface standard because of their ability to interpret and display information having standard formats (e.g., HyperText Markup Language (HTML), standard text, GIF, etc.). Client software programs, popularly referred to as Web Browsers (e.g., Mosaic, Netscape Navigator, Microsoft Internet Explorer, etc.), execute on client systems and issue requests to server systems. The server systems typically execute HyperText Transport Protocol (HTTP) server programs which process requests from the Web Browsers and deliver data to them. The system that executes an HTTP server program and returns data to the Web Browser will hereinafter be referred to as a Web Server System. An HTTP server program itself will be referred to as a Web Server.

A Web Server System has access to on-line documents that contain data written in HyperText Markup Language (HTML). The HTML documents contain display parameters, capable of interpretation by a Web Browser, and references to other HTML documents and Web Servers (source: World Wide Web: Beneath the Surf, from UCL Press, by Mark Handley and Jon Crowcroft, on-line at http://www.cs.ucl.ac.uk/staff/jon/book/book.html).

Typically, information regarding a given Web Site is "hard coded" into an associated Web Page written in HyperText Markup Language (HTML). For example, most Web Sites will have links to other Web Sites. If additional links are to be added, as will occur when new information is added to a Web Site, the HTML code for the Web Site must be modified to provide access to these links. Thus, it is a formidable and time consuming task to keep these HTML links both functional and current.

Furthermore, a list of "recent updates to this Web Site" is typically included as part of the Web Site, and is usually maintained by a Web Site administrator. If a Web Site has frequent changes (e.g., when information is added to a Web Site), this updating process can be a burden, and users may not always have information regarding the latest state of the Web Site.

SUMMARY OF THE INVENTION

The present invention overcomes many of the disadvantages associated with the prior art by providing a method and apparatus for dynamically providing Web Site status information to a user via a Web Browser. More specifically, the present invention allows a user to gather information on which pages within a Web Site have been updated.

To accomplish this automated information gathering task, the present invention utilizes a special purpose search gateway to interconnect the user's Web Browser to a Web Server containing the Web Site of interest. This special purpose gateway contains a program which traverses a portion of the Web-accessible file structure of a Web Site on a Web Server, starting at the root node specified by the Web Site administrator when configuring the program. This program is invoked by choosing an action via a Web Browser (e.g., clicking on a link or a button) which invokes a call to a program running on a particular server.

In a preferred embodiment, this program searches for files which have been modified within a predetermined relative period of time (e.g., within the last 10 days), then builds a table of links to these files. In another embodiment, the program searches for files that have been modified after a predetermined absolute date (e.g., all files updated since Jul. 1, 1998), and builds a table of links to the resultant files. The table is returned to the user so that the user may investigate changes made recently to the Web Sites. Thus, the present invention provides a mechanism to allow users to view recently-updated areas within a Web Site without requiring any action on the part of the Web Site administrator.

In other embodiments, the present invention returns links to files based on information related to aspects of a file other than the update status, such as file extension type and file directories. In a preferred embodiment, the Web Site administrator is allowed to specify the root node which is traversed. In other embodiments, the Web Site administrator (or any other user of the present invention) could also be allowed to specify which types of files to include in the search by specifying file extensions, file sizes, and file directories. Users of the present invention also have the capability to customize the table of results generated by the search.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method operations in operating a computer and the method of computation itself. The present invention related to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms present herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

Figure 1:
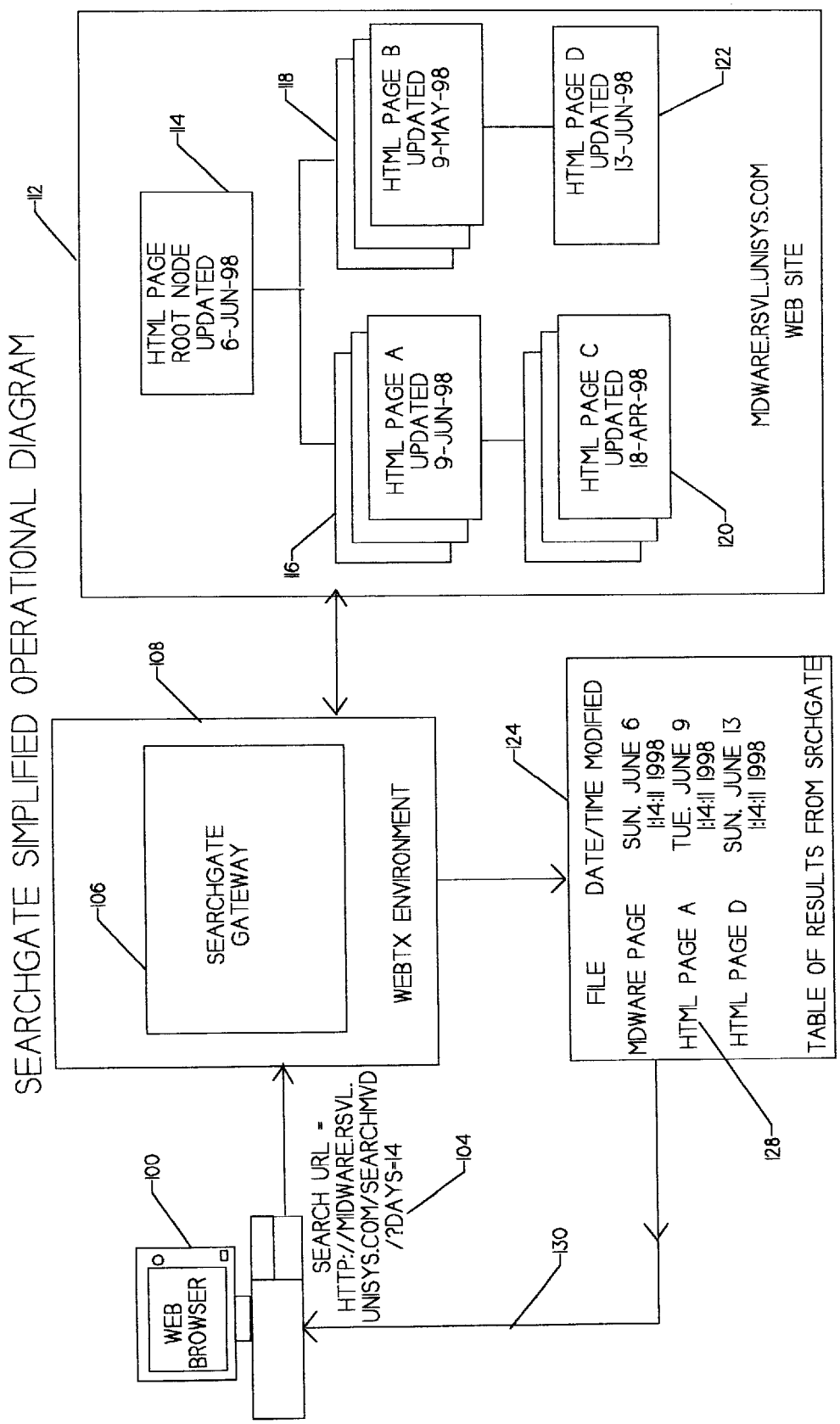
FIG. 1 is a simplified, block oriented operational diagram of the present invention (SearchGate)

FIG. 1 is a simplified, block oriented operational diagram of the present invention (SearchGate) 106. The present invention dynamically provides Web Site 112 status information to a requesting user at a Web Browser 100. More specifically, the present invention allows a user to dynamically gather information on which pages within a Web Site 112 have been updated.

In a preferred embodiment, a user chooses an action via a Web Browser 100. A user at a Web Browser 100 can invoke the SearchGate gateway 106 through any of several typical HTML techniques: by clicking on a link or action field in an existing Web Page or typing in an invocation manually using the "location", "address", or equivalent field on a browser. A sample manual invocation is shown at 104. The sample invocation 104 includes a Uniform Resource Locator (URL) along with some additional SearchGate parameters specified in "name=value" pairs. URLs are the basis for referring to resources (files, services, and so on) on the Web. A URL consists of a string of characters that uniquely identify a resource. When a Web Browser 100 opens a particular URL, the user gains access to the resource referred to by the URL. In the sample invocation 104, the "midware.rsvl.unisys.com" portion of the invocation 104 defines the Web Server being accessed, while "SEARCHMVD" is a path prefix which WebTx uses to route the request to SearchGate 106. In the last portion of the sample invocation 104, information after the question mark comprises "name=value pairs" which define run-time input parameters to the SearchGate gateway 106. In the sample invocation 104, the "Days" value is set to 14, indicating that all candidate files updated within the last 14 days should be listed.

The SearchGate gateway 106 of the present invention resides within the Unisys WebTx environment 108. In general, WebTx 108 is middleware in a client/server computing environment which accepts requests from the client side and routes the requests to the correct place on the server side, then passes a response from the server side back to the client side. In the context of the present invention, WebTx "marries" a Web Browser 100 (the client side) with the directory structure and file attributes available through a Web Server 112 (the server side).

Once SearchGate 106 has been invoked from the Web Browser 100, the program traverses a portion of the Web-accessible file structure of the server 114, 116, 118, 120 and 122, starting at the root node 114 specified by the Web Site administrator when configuring the program, to obtain information about the files existing under the root node 114 in the Web-accessible file structure hierarchy.

In a preferred embodiment, the program searches for files which have been modified within a predetermined period of time, retrieves Web Page files 128 which meet the user-defined search criteria, then builds a table of links 124 to these files. The table of links 124 is returned to the user's Web Browser 100 via interface 130 so that the user may investigate changes made recently to the Web Site. Thus, this feature provides a mechanism to allow users to view recently-updated areas within a Web Site 112 without requiring any action on the part of the Web Site administrator.

Figure 2:
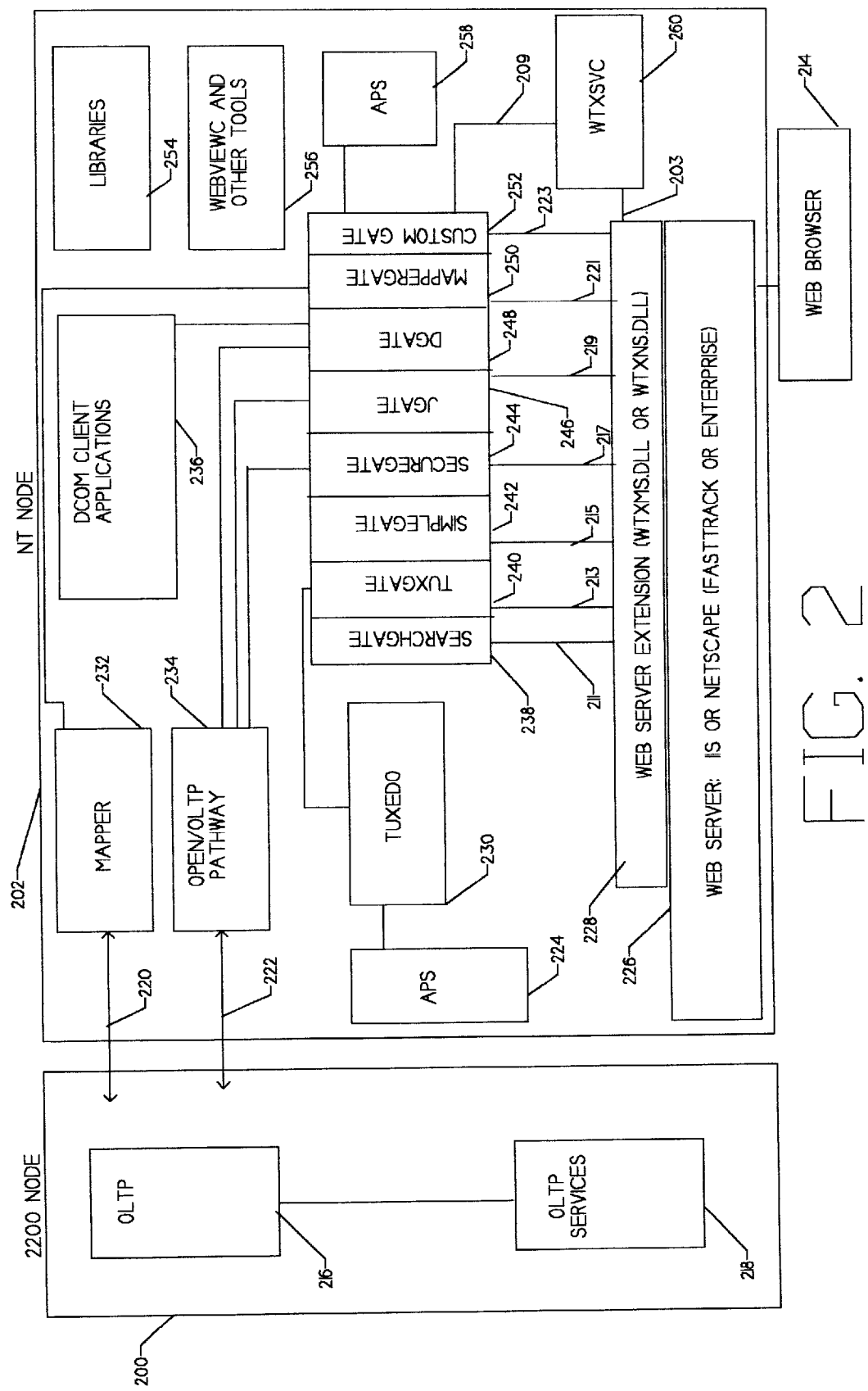
FIG. 2 is an illustrated overview of the generalized computing environment in which the present invention resides.

FIG. 2 is an illustrated overview of the generalized computing environment in which the present invention resides. The WebTx environment, as utilized in the present invention, is comprised of several components, including a Web Server 226, Web Server Extension (WTXMS.DLL or WTXNS.DLL) 228, a Monitor (WTXSVC) 260, one or more Gateways 238, 240, 242, 244, 246, 248, 250, 252, the WebViewC compiler and other special purpose tools 256, and a set of libraries 254.

The WebTx Monitor 260 communicates with the Web Server Extension 228 via interface 203, and a Gateway 238, 240, 242, 244, 246, 248, 250, or 252 via interface 209. The Monitor 260 functions as the WebTx administrative tool. One function of the Monitor 260 is to start and stop the gateways 238, 240, 242, 244, 246, 248, 250, and 252, as needed. Within a Unix environment, the WebTx monitor module is known as WebMon (not shown), while under the Windows NT environment, the WebTx monitor module is known as WtxSvc 260.

The WebTx Web Server Extension component 228, is a run-time extension of the Web Server 226 (such as Netscape FastTrack, Netscape Enterprise, or Microsoft IIS). The function of the Web Server Extension 228 is to intercept requests intended for WebTx and route the requests to the Gateways 238, 240, 242, 244, 246, 248, 250, or 252. The Web Server Extension 228 will also interpret the response from the Gateways 238, 240, 242, 244, 246, 248, 250, or 252, and route the reply. The Web Server Extension 228 is connected to the Gateways 238, 240, 242, 244, 246, 248, 250, or 252 via interfaces 211, 213, 215, 217, 219, 221, and 223. The Web Server Extension 228 is connected to the Monitor 260 via interface 203.

The Gateways 238, 240, 242, 244, 246, 248, 250, and 252 perform tasks which are grouped into conceptual areas. The Gateways 238, 240, 242, 244, 246, 248, 250 and 252 receive requests from the Web Server Extension 228 or from the Applications 258 and take whatever action is necessary to fulfill the request. In some cases, this can involve transforming a request (such as a URL from a Web Browser or remote procedure calls (RPCs) from a DCOM client) into a format which is understandable by a Distributed Transaction Processing System such as a Unisys 2200 Enterprise System 200. The Gateways 238, 240, 242, 244, 246, 248, 250, and 252 can also transform data returned from the Distributed Transaction Processing System 200 into a formatted response which is returned to the requester.

The SimpleGate Gateway 242 is specifically utilized as a test tool. It merely echoes a request. The TUXGate Gateway 240 provides generalized access to OLTP services through BEA TUXEDO 230. BEA TUXEDO 230 acts as the hub for a distributed enterprise and Internet 3-tier applications. It provides an open environment that supports a wide variety of clients, databases, networks, legacy systems, and communications options. ViewGate (not shown) provides generalized access to OLTP services on the Unisys 2200 node (specifically, HTML output). The FileGate Gateway (not shown) works in conjunction with a specific OLTP service to access textual files on the Unisys 2200 node. JGate 246 provides generalized Java applet access to OLTP services on the Unisys 2200 node. The DGate Gateway 248 provides generalized DCOM access to OLTP services on the Unisys 2200 node. The MapperGate Gateway 250 provides generalized access to Mapper applications. The SecureGate Gateway 244 acts as a bridge between a Web generated transaction and an enterprise-based security service. A Custom Gateway, such as shown at 252, provides a way for a customer to build their own Gateway to interface their own applications to an OLTP enterprise application. Finally, the search gateway (SearchGate) 238, the object of this invention, allows a user at a Web Browser 214 to dynamically gather Web Site status information, such as which pages within a Web Site residing on a Web Server have been recently updated.

The WebViewC compiler 256 is used in conjunction with specific Gateway implementations, such as ViewGate, TUXGate, and JGate. The WebViewC compiler 256 compiles Open/OLTP view files generated on the OLTP enterprise system to create WebTx view files (.wv) and HTML files (.html). The WebViewC compiler is a free-standing component with no direct communication to any of the other components within the WebTx environment.

Other WebTx Components include libraries 254 such as the Software Development Kit (SDK) libraries, which provide framework and functions for building Custom Gateways. The SDK is specifically designed to allow customers to build their own gateways. Another type of library present within the WebTx system are Java Class Libraries, which provide class definitions for building JGate compatible applets.

Figure 3:
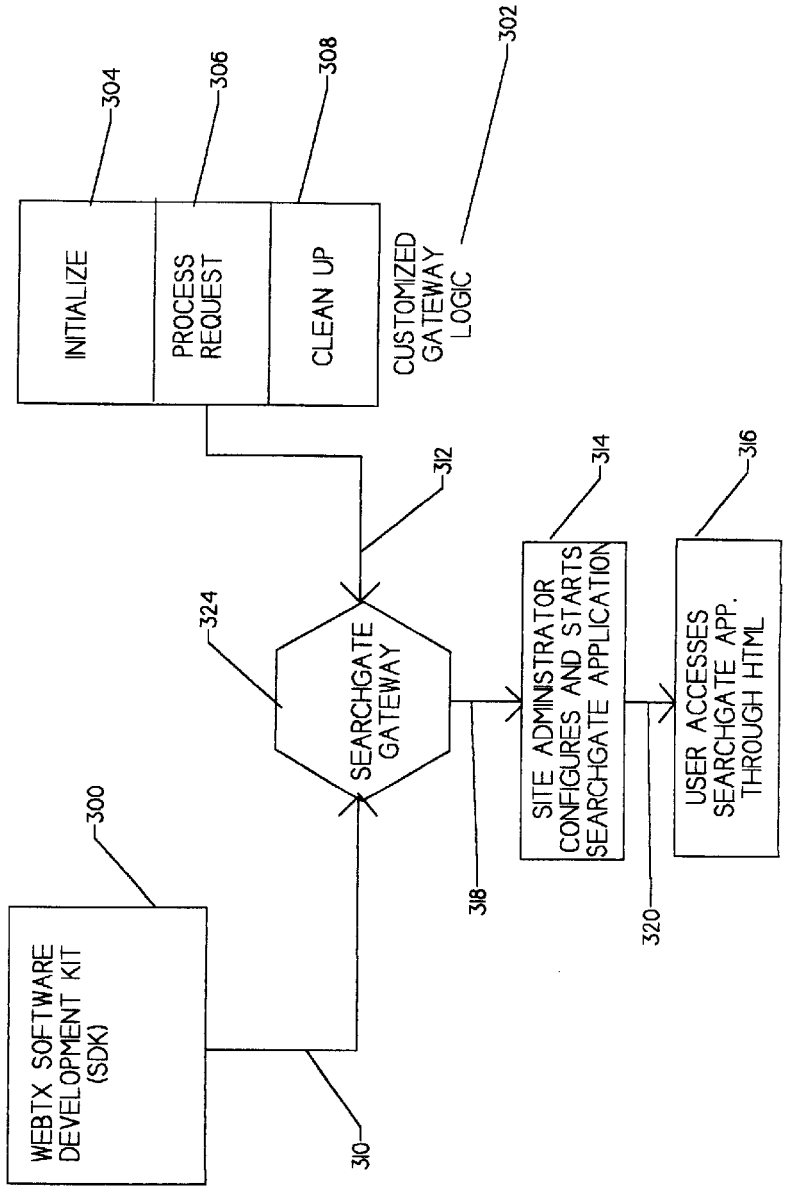
FIG. 3 is a simplified diagram which describes building, initializing and accessing the SearchGate transactional gateway of the present invention.

FIG. 3 is a simplified diagram which describes building, initializing, and accessing the SearchGate transactional gateway of the present invention. A WebTx transactional gateway (such as SearchGate) 324 is constructed from two primary building blocks 300 and 302.

The first building block, WebTx Software Development Kit (SDK) libraries 300, provides the shell and utilities for a gateway 324. The WebTx Software Development Kit (SDK) libraries 300 are available commercially from Unisys Corporation.

The second building block, user-developed customized gateway logic 302, provides the logic which defines a particular gateway's purpose. This customized gateway logic 302 is encapsulated in three specifically-named routines which must be provided as part of the gateway 324.

The first routine, Initialize 304, is called once when the gateway 324 starts. This Initialize routine 304 typically handles configuration parameters such as arguments and environment variables, opens communications with other software components, and allocates memory space that will be needed by the other two routines (Process Request 306 and Clean Up 308). The intent of the Initialize routine 304 is to set global values and perform as much up-front work as possible to reduce performance drains later.

The second routine, Process Request 306, is called once for each request that is routed to the SearchGate gateway 324 by WebTx. This Process Request routine 306 performs the main task for which the gateway is defined.

The third routine, Clean Up 308, is called once at gateway determination time. Clean Up 308 de-allocates memory, cleanly closes communication with other software components, and does whatever other work is necessary to shut the gateway down.

The SearchGate 324 custom gateway executes on a Windows NT platform. Being a custom gateway, it provides the three named routines defined above: Initialize 304, Process Request 306, and Clean Up 308. A site administrator must initially configure and start SearchGate 324 (as shown at 314). When SearchGate 324 is started, the Initialize routine 304 is executed.

A user at a Web Browser can then invoke the gateway 324 through any of several typical HTML techniques 316. The user can type the invocation in manually using the "location", "address", or equivalent field on a browser, or the invocation could be through a link or action field in an existing Web Page. An example of a manually invoked command follows:
Example URL: http://mid.rsvl.unisys.com/SEARCHMVD/?Days=14

In the above example, the Uniform Resource Locator (URL) "mid.rsvl.unisys.com" defines the Web Server being accessed, while "SEARCHMVD" is a path prefix which WebTx uses to route the request to SearchGate 324. In the last portion of the URL, information after the question mark comprises "name=value pairs" which define run-time input parameters to the gateway. In this example, the "Days" value is set to "14", indicating that all candidate files updated within the last 14 days should be listed.

When a Web Site administrator wishes to discontinue the operation of SearchGate 324, he or she uses normal WebTx methods to stop the gateway. At this point, the Clean Up routine 308 is invoked.

Figure 4:
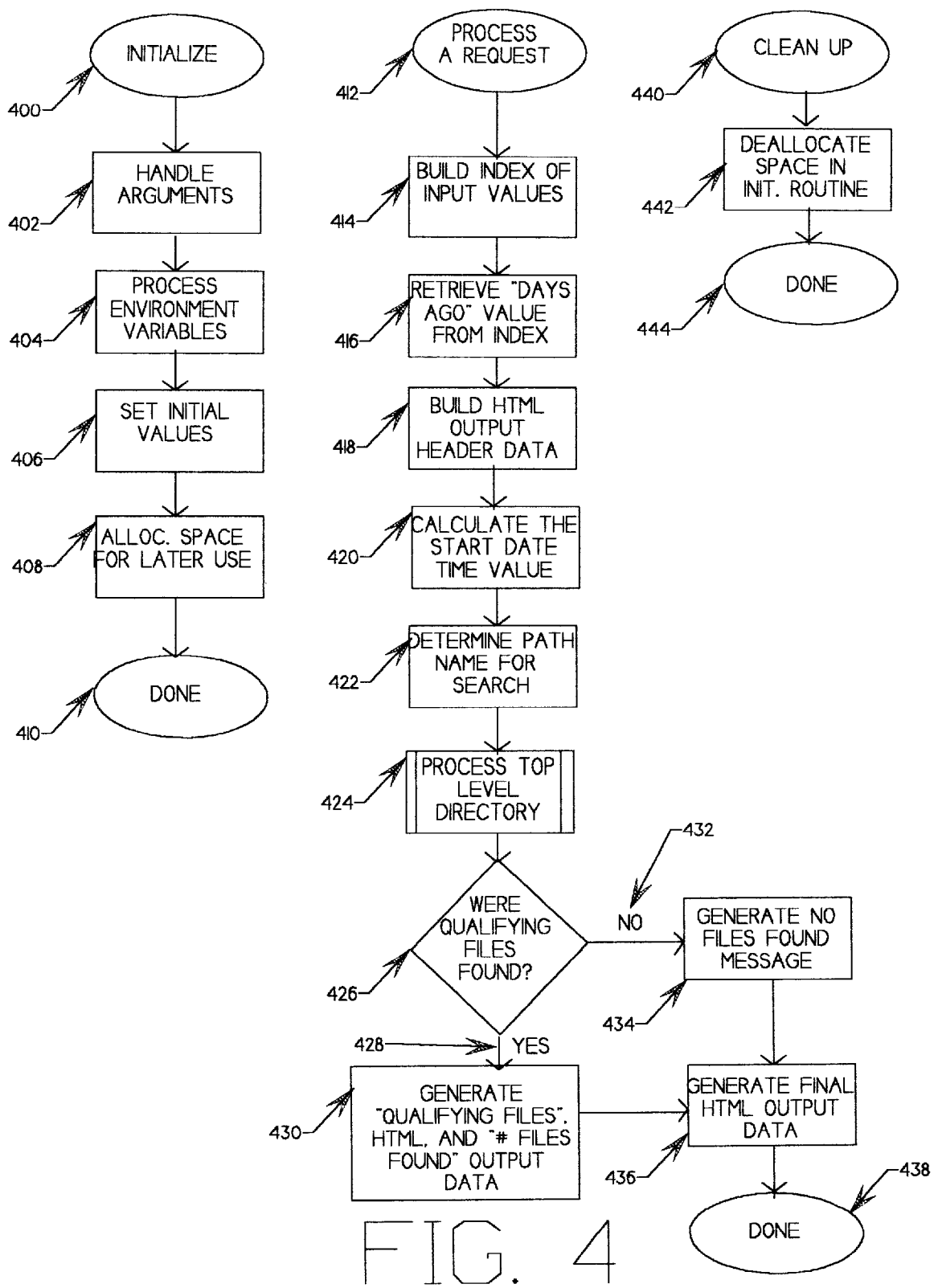
FIG. 4 is a flowchart diagram of the three major functional routines within the SearchGate code: Initialize(), ProcessRequest(), and CleanUp()

FIG. 4 is a flowchart diagram of the three major functional routines within the SearchGate code: Initialize 400, Process Request 412, and Clean Up 440. The purpose of the Initialize 400 routine, called once when the gateway starts, is to set global values and perform as much up-front work as possible to reduce performance drains later.

The Initialize routine 400 begins by handling configuration parameters such as arguments 402 and environment variables 404. After the configuration parameters 402 and 404 have been handled, the Initialize routine 400 next sets initial values for the program 406. Finally, the Initialize routine 400 allocates memory space 408 that will later be used by the Process Request routine 412 and the Clean Up routine 440. The Initialize routine 400 then terminates at element 410, after completion of the memory allocation step 408.

Upon completion of the Initialize routine 400, the SearchGate code will next enters the Process Request routine 412. The Process Request routine 412 begins by building an index of input values (handling both POST and GET methods) 414 passed to the routine 412 from the user. The routine 412 next retrieves the "days ago" value from an index of input values, or uses a default value, as shown at 416. Next, the Process Request routine 412 builds HTML output header data to send back to the requesting Web Browser, as shown at 418. The routine then calculates the "start of qualifying date/time" value for the search, as shown at 420. Next, the full path name of the top-level directory to be searched is determined, as shown at 422. The routine 412 then begins by processing the root level directory, as shown at 424. Directory processing is done by the "Process A Directory" routine, further described in FIG. 5. This routine will recursively process all subdirectories located within the hierarchy defined by the root level directory.

Recursion is defined as a programming method in which a routine calls itself. Thus if a new directory entry is encountered while processing the files of the top level directory, the "Process a Directory" routine is called from within itself, using the new directory entry as the new top level directory entry.

The program then determines if any qualifying files were found, as shown at 426. If no qualifying files were found 432, a "no files found message" is generated. If one or more qualifying files were found 428, HTML output data giving details on the qualifying files and showing the "number of files found" is generated, as shown at 430. Finally, generation of the final HTML output data takes place at 436, and the Process Request routine 412 terminates at 438.

The Clean Up routine 440 is called upon the completion of the Process Request routine 440. The Clean Up routine 440 de-allocates space allocated in the Initialize routine 442, then ends at 444.

Figure 5:
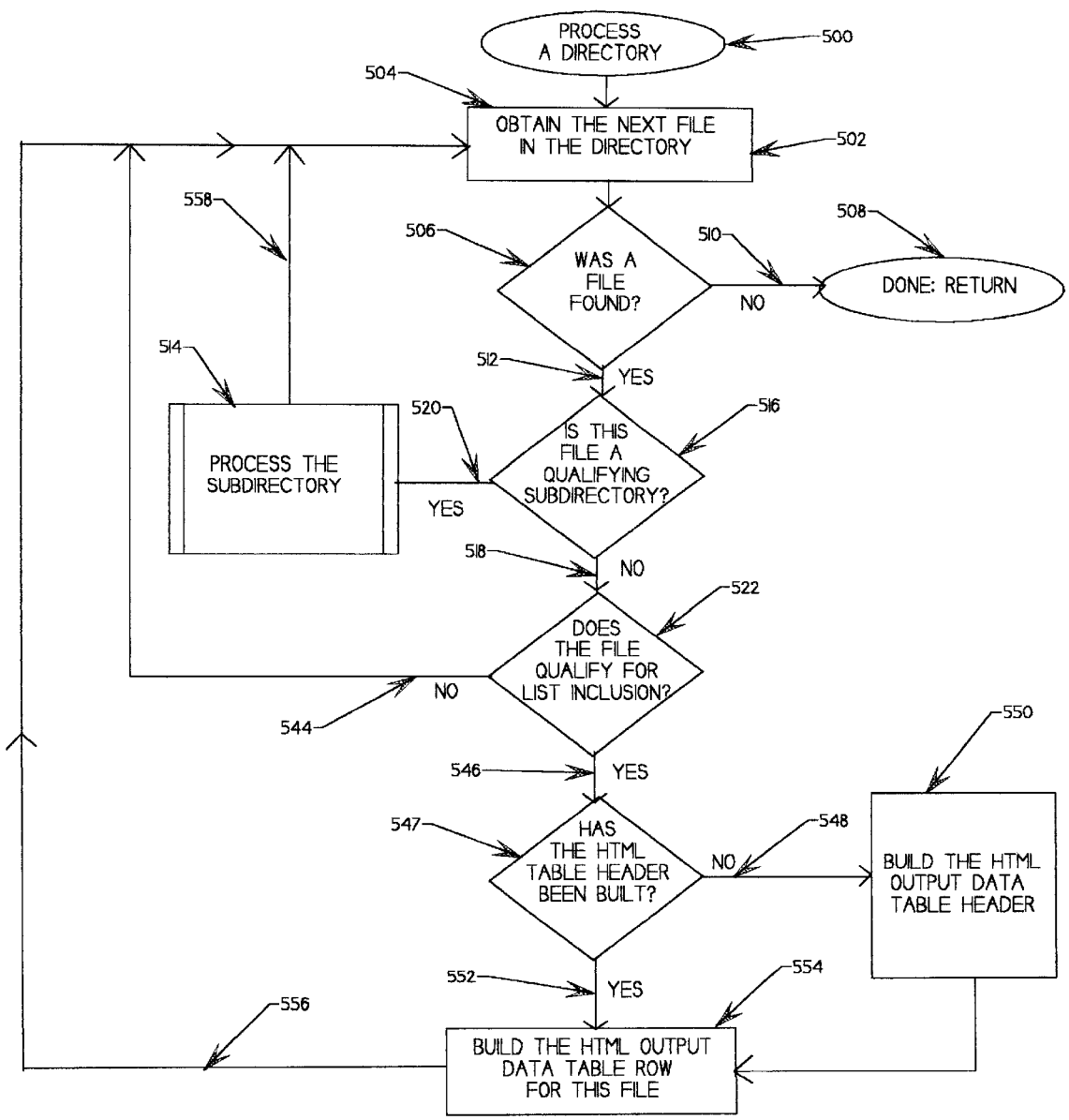
FIG. 5 is a flowchart diagram of the "Process a Directory" subroutine found within the ProcessRequest() routine described in FIG. 4.

FIG. 5 is a flowchart diagram of the "Process a Directory" subroutine 500 found within the Process Request routine 412 described in FIG. 4. The "Process A Directory" routine 500 begins by obtaining the next file in the current directory, as shown at 502. If no more files remain to be processed 510, the routine ends at 508, and control is passed back to the calling routine, which is either the Process Request routine FIG. 4, at 440, or this routine at Process the Subdirectory 514, if a recursive call is made. If a file was found 512, it is next determined whether the file is a qualifying subdirectory (a subdirectory meeting user supplied search criteria) 516. If so 520, the qualifying subdirectory is recursively processed by calling the Process A Directory routine 500 on the qualifying directory, as shown at 514.

If the file is not a qualifying subdirectory 518, the routine next determines whether the current file qualifies for inclusion in the list of results for the search returned to the user, as shown at 522. If the file does not qualify for list inclusion 544, the next file is obtained, as shown at 502. If the file does qualify for list inclusion 546, the routine next determines if the HTML table header has been built 547. If not 548, the routine next builds the HTML output data table header, as shown at 550. If the header was previously built 552, step 550 is ignored.

Processing continues at 554 where the HTML output data table row entry for this file is built 554. After the data table row entry is built, control is passed back to 502, where the next file in the directory is obtained.

Figure 6:
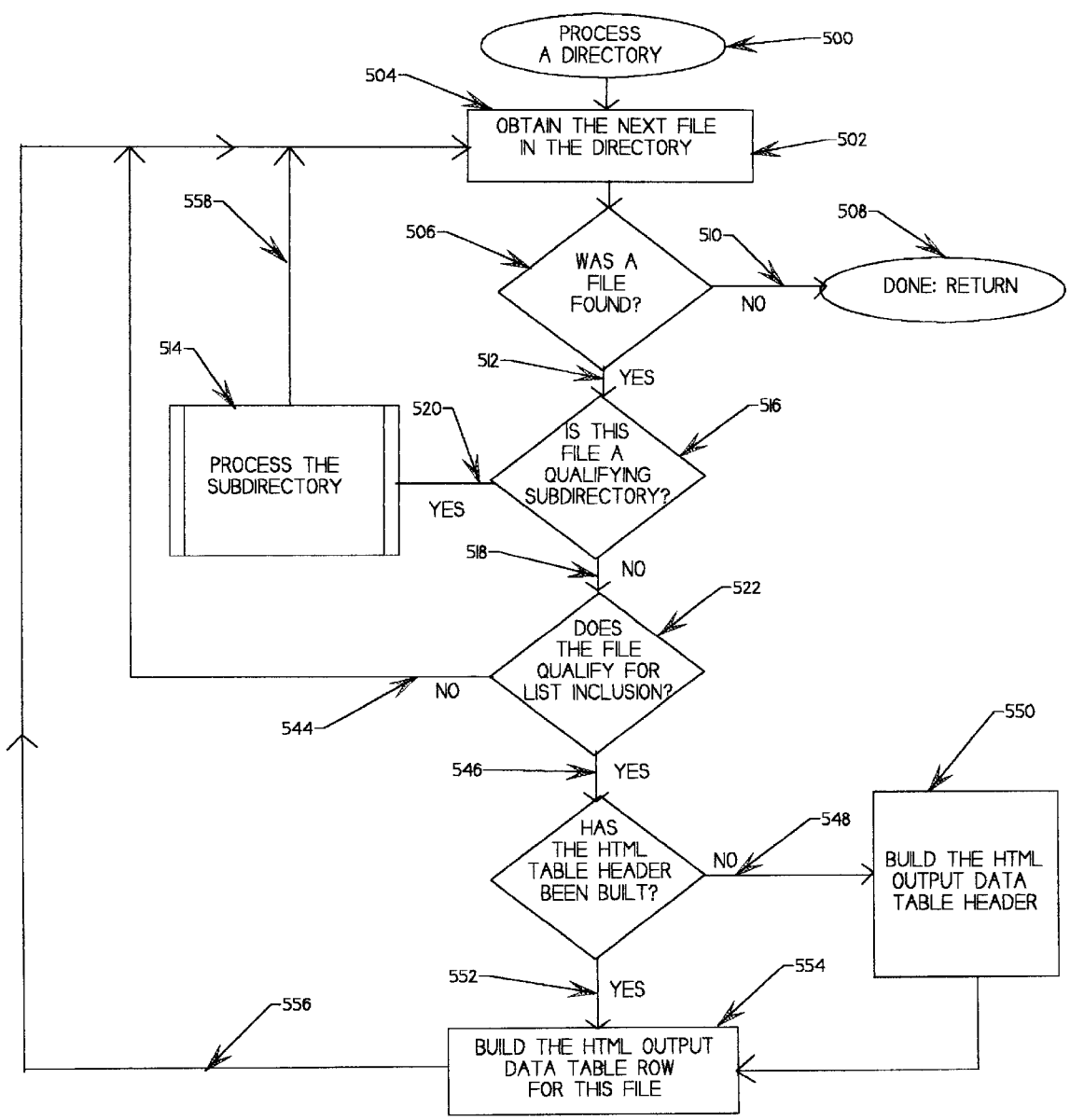
FIG. 6 is an illustrative example (viewed through a Web Browser) of the tabular results generated by SearchGate upon successful completion of a Web Page search request.

FIG. 6 is an illustrative example (viewed through a Web Browser) of the tabular results generated by SearchGate upon successful completion of a Web Page search request. The tabular results of the SearchGate results are returned to the user in the form of an HTML output file, as shown at 600. This HTML output file 600 is in a format which is readable by a Web Browser such as Navigator by Netscape Corporation, or Internet Explorer by Microsoft Corporation.

The HTML output table header is shown at 604. The original URL search request generated by the user is shown at 602. The output data table containing all Web Pages meeting the user generated search criteria is shown at 606. Each entry line in the output data table 606 includes the file name in hyperlink format as shown at 608, and a date/time modified entry as shown at 610. A hyperlink, such as the file name shown at 608, allows a user to click on the hyperlink and immediately jump to the Web Page associated with the displayed hyperlink.

Having thus described the preferred embodiments of the present invention, those of skill in the art will readily appreciate that the teachings found herein may be applied to yet other embodiments within the scope of the claims hereto attached.

We Claim:

1. In a computing environment having a Web Browser operating within a first software environment connected to a Web Server operating within a second software environment via a gateway which transforms a request from said Web Browser into a format understandable by said Web Server, wherein at least one Web Site resides on said Web Server, the improvement comprising:

means for searching said Web Site for Web Site status information upon issuance of a request from said Web Browser and for producing a result, wherein said searching means resides on said gateway.

2. A computing environment according to claim 1 wherein said Web Site has at least one Web Page file.

3. A computing environment according to claim 2 wherein said Web Page files are organized in a hierarchical, web-accessible data structure.

4. A computing environment according to claim 3 wherein said searching means determines which said Web Pages files residing within a user-specified Web Site location have been updated since a user-specified relative date, wherein said user-specified Web Site location and said user-specified relative date are provided to said searching means by said request from said Web Browser.

5. A computing environment according to claim 4 further comprising an administrator software module wherein said searching means is restricted to search only said Web Page files which satisfy an administrator-specified file extension restriction, wherein said administrator-specified file extension restriction is provided to said searching means by a prior administrative action.

6. A computing environment according to claim 4 wherein said searching means is restricted to search only said Web Page file subdirectories which satisfy an administrator-specified file subdirectory restriction, wherein said administrator-specified file subdirectory restriction is provided to said searching means by a prior administrative action.

7. A computing environment according to claim 1 wherein said searching means returns a set of results to said Web Browser after the search has been completed.

8. A computing environment according to claim 1 wherein said results are returned to said Web Browser in the form of HyperText Markup Language (HTML) source code.

9. A computing environment according to claim 8 wherein said results are displayed at said Web Browser in a tabular format.

10. In a computing environment having a Web Browser connected to a Web Server via a gateway, wherein at least one Web Site resides on said Web Server, the improvement comprising:
  means for searching said Web Site for Web Site status information upon issuance of a request from said Web Browser, wherein said searching means resides on said gateway;
  wherein said results are displayed at said Web Browser in a tabular format; and
  wherein said table of results includes information on which files have been updated, including links to said Web Pages meeting the search criterion specified in said request.

11. A computing environment according to claim 10 wherein information supplied in said table of results is administrator-tailorable.

12. A computing environment according to claim 11 wherein said searching means executes on a workstation platform.

13. A computing environment according to claim 10 wherein said Web Site has at least one Web Page file.

14. A computing environment according to claim 13 wherein said Web Page files are organized in a hierarchical, web-accessible data structure.

15. A computing environment according to claim 14 wherein said searching means determines which said Web Pages files residing within a user-specified Web Site location have been updated since a user-specified relative date, wherein said user-specified Web Site location and said user-specified relative date are provided to said searching means by said request from said Web Browser.

16. A computing environment according to claim 15 wherein said searching means is restricted to search only said Web Page files which satisfy an administrator-specified file extension restriction, wherein said administrator-specified file extension restriction is provided to said searching means by a prior administrative action.

17. A computing environment according to claim 15 wherein said searching means is restricted to search only said Web Page file subdirectories which satisfy an administrator-specified file subdirectory restriction, wherein said administrator-specified file subdirectory restriction is provided to said searching means by a prior administrative action.

18. A computing environment according to claim 10 wherein said searching means returns a set of results to said Web Browser after the search has been completed.

19. A computing environment according to claim 10 wherein said results are returned to said Web Browser in the form of HyperText Markup Language (HTML) source code.

20. Apparatus for dynamically providing Web Site status information to a Web Browser, wherein said Web Browser is connected to a Web Site via a gateway, said apparatus having:
  a first communications component connecting said Web Browser to said gateway, wherein said first communications component passes a user generated search request to said gateway from said Web Browser, and a subsequent set of search results from said gateway to said Web Browser;
  a search program residing on said gateway which accesses said Web Site through a second communications component, traverses a Web Page file hierarchy of said Web Site, generates said set of results which matches said search request, and returns said results to said gateway.

21. An apparatus of claim 20 wherein said Web Site status information returned by said search program includes a table of Web Pages that have been recently updated based upon a user-supplied threshold date criteria.

22. An apparatus according to claim 21 wherein said returned Web Site status information is administrator-tailorable.

23. An apparatus of claim 21 wherein said table of Web Pages includes links to said recently updated Web Pages.

24. In a computing environment having a Web Browser operating within a first software environment connected to a Web Server operating within a second software environment via a gateway with at least one Web Site residing on said Web Server, a method for dynamically searching said Web Site for Web Pages within said Web Site which meet an administrator-tailorable search criteria, comprising the steps of:
  generating a search request at said Web Browser which includes said administrator-defined search criteria;
  sending said search request to a search program residing on said gateway;
  processing said search request at said gateway with said search program residing on said gateway by converting said search request from a first format compatible with said first software environment to a second format compatible with said second software environment, generating a search response; and
  returning said search response from said search program to said Web Browser.

25. In a computing environment having a Web Browser connected to a Web Server via a gateway with at least one Web Site residing on said Web Server, a method for dynamically searching said Web Site for Web Pages within said Web Site which meet an administrator-tailorable search criteria, comprising the steps of:
  generating a search request at said Web Browser which includes said administrator-defined search criteria;
  sending said search request to a search program residing on said gateway;
  processing said search request at said gateway with a search program residing on said gateway, wherein said search program accesses a Web Site, traverses a selected Web Page hierarchical file structure on said Web Site, and builds a table of Web Pages which match said administrator-defined search criteria from said search request; and
  returning a search response to said Web Browser which includes said table of matching Web Pages.

26. A method of claim 25 wherein said traversal of a selected Web Page hierarchical file structure by said search program is done recursively.

27. In a computing environment having a Web Browser operating within a first software environment connected to a Web Server operating within a second software environment via a gateway which converts information from a first format compatible with said first software environment to a second format compatible with said second software environment with at least one Web Site residing on said Web Server, a method for dynamically searching said Web Site for Web Pages which have been updated within a user-definable period of time, comprising the steps of:

generating a search request in said first format at said Web Browser, specifying said user-definable period of time;

sending said search request from said Web Browser to a search program residing on said gateway;

processing said search request at said gateway with said search program residing on said gateway, wherein said search program accesses a Web Site using said second format, traverses a selected Web Page hierarchical file structure on said Web Site, identifies which Web Pages have been updated within said user-definable period of time, and builds a table of Web Pages which satisfy said search request; and returning a search response in said second format to said Web Browser which includes said table of matching Web Pages.

28. An apparatus comprising:

a. A web terminal providing a first software environment;

b. A web browser resident on said web terminal;

c. A search request generated by said web browser in a first format;

d. A web server providing a second software environment coupled to said web terminal via a publically accessible digital communication network;

e. A gateway, resident within said web server, which converts said search request from said first format to a second format compatible with said second software environment;

f. A plurality of web pages resident within said web server; and g. A search module for searching said plurality of web pages in response to said search request converted into said second format.

29. An apparatus according to claim 28 wherein said web terminal further comprises an industry standard personal computer.

30. An apparatus according to claim 29 wherein said publically accessible digital data communication network further comprises the Internet.

31. An apparatus according to claim 30 where in said web server further comprises a Unisys 2200 mainframe.

* * * * *